US012610969B2

(12) United States Patent
Mimouni et al.

(10) Patent No.: US 12,610,969 B2
(45) Date of Patent: Apr. 28, 2026

(54) PROCESS FOR FAT REDUCTION IN FROZEN DAIRY PRODUCTS

(71) Applicant: General Mills, Inc., Minneapolis, MN (US)

(72) Inventors: Arnaud Mimouni, Lyons (FR); Violaine Pistre, Lyons (FR); Andreas Schopf, Lyons (FR); Javier Romero, Barcelona (ES)

(73) Assignee: General Mills, Inc., Minneapolis, MN (US)

( * ) Notice: Subject to any disclaimer, the term of this patent is extended or adjusted under 35 U.S.C. 154(b) by 216 days.

(21) Appl. No.: 18/281,684

(22) PCT Filed: Mar. 25, 2021

(86) PCT No.: PCT/IB2021/000194

§ 371 (c)(1),
(2) Date: Sep. 12, 2023

(87) PCT Pub. No.: WO2022/200823

PCT Pub. Date: Sep. 29, 2022

(65) Prior Publication Data

US 2024/0306666 A1 Sep. 19, 2024

(51) Int. Cl.
| | |
|---|---|
| *A23G 9/52* | (2006.01) |
| *A23G 9/04* | (2006.01) |
| *A23G 9/32* | (2006.01) |

(52) U.S. Cl.
CPC ................. *A23G 9/52* (2013.01); *A23G 9/04* (2013.01); *A23G 9/327* (2013.01)

(58) Field of Classification Search
CPC ............. A23G 9/04; A23G 9/327; A23G 9/52
See application file for complete search history.

(56) References Cited

U.S. PATENT DOCUMENTS

| | | | |
|---|---|---|---|
| 6,497,913 | B1 | 12/2002 | Gray et al. |
| 6,726,949 | B2 | 4/2004 | Adolphi et al. |
| 7,947,321 | B2 | 5/2011 | Brophy et al. |
| 8,936,821 | B2 | 1/2015 | Ummadi et al. |
| 10,219,526 | B2 | 3/2019 | Ummadi et al. |
| 10,440,973 | B2 | 10/2019 | Diekhaus |
| 2003/0068421 | A1 | 4/2003 | Adolphi et al. |
| 2004/0197450 | A1 | 10/2004 | Schorsch |
| 2018/0168186 | A1 | 6/2018 | Hedges et al. |

FOREIGN PATENT DOCUMENTS

| | | |
|---|---|---|
| CN | 103931864 | 7/2014 |
| CN | 104920777 | 9/2015 |
| EP | 0147483 | 7/1985 |
| EP | 1400176 | 3/2004 |
| JP | 2001231457 | 8/2001 |
| JP | 2001269123 A | 10/2001 |
| WO | WO 2000/001246 | 1/2000 |

OTHER PUBLICATIONS

Machine translation of JP 2001-231457, publication date Aug. 2001, pp. 1-14. (Year: 2001).*
Dresselhuis et al., "*The Occurrence of In-Mouth Coalescence of Emulsion Droplets in Relation to Perception of Fat*", Science Direct, Food Hydrocolloids, No. 22, pp. 1170-1183, 2008.

* cited by examiner

*Primary Examiner* — Jenna A Watts
(74) *Attorney, Agent, or Firm* — Jordan IP Law, LLC; Annette M. Frawley, Esq.

(57) ABSTRACT

Methods of making a homogenized and pasteurized mix for making low overrun ice cream are disclosed. The methods include a high-pressure homogenization step and/or a high temperature pasteurization step to improve creaminess and/or melt resistance in an ice cream. Mixes and ice creams made using the methods described are also disclosed.

17 Claims, No Drawings

PROCESS FOR FAT REDUCTION IN FROZEN DAIRY PRODUCTS

CROSS-REFERENCE TO RELATED APPLICATIONS

This application represents a National stage application of PCT/IB2021/000194, filed Mar. 25, 2021, entitled "A Process for Fat Reduction in Frozen Dairy Products". The entire content of this application is incorporated by reference.

BACKGROUND

Consumers enjoy dairy dessert products intended to be consumed while frozen, such as ice cream, frozen yogurt, and gelato. It is known that a process for preparing a mix for frozen dairy products should be pasteurized and homogenized. A number of patent applications have been filed to describe the homogenization step.

WO2016/075016 relates to an aqueous composition in liquid form, which contains oil, milk protein, monosaccharides, disaccharides, and/or oligosaccharides, one or more emulsifiers, and a combination of water-insoluble cellulose-based fibres and one or more water-soluble hydrocolloids. The process to prepare such composition may comprise an optional first homogenization step before an optional pasteurization step and a second homogenization step after such optional pasteurization step. Such second homogenization step could be performed at high pressure, typically from 200 to 500 bars. Such composition comprises oil at a concentration ranging from 0.5% to 8% by weight. This composition is useful for preparing a low fat ice cream.

EP1094718 relates to the use of a homogenizer operating at higher pressures (ca. 2000 bar) than those conventionally used in ice cream manufacturing, to generate smaller oil droplet sizes (ca. 0.3 mu m) in an ice cream premix. It is said to allow stabilization of a larger air:water interface, leading to smaller discrete gas cells which in turn modify the organoleptic quality of the ice cream. It is also put forward that the sensory properties of ice cream is dependent on the size of the fat droplets and that for a given air cell size, the ice cream with the smallest fat droplets scores best on creaminess when blind tested by a trained panel. EP1094718 exemplifies the preparation of a premix comprising at most 12 to 15% fat (w/w), up to 1% (w/w) emulsifier, and 45 to 85% (w/w) of water.

JP2001231457 relates to an ice cream having a good flavor and melt in mouth by using a high pressure homogenization and simultaneously using an electromagnetic freezing to reduce the particle diameter of fat spheres in the ice cream and also reducing air bubble diameter and ice crystal diameter. The fat globules have a particle size of 1.2 μm or less. The fat content in the mix according to examples is of 8% by weight, which corresponds to a low fat ice cream.

EP 2936991 (US 2015/305360) relates to long-life cream without preservative but not specifically to ice cream. It relates broadly to creams. The method is for producing a milk product, preferably a cream product having an average particle size less than 3 μm, which has a shelf life of at least 4 weeks, but does not contain preservatives. It describes in particular a method comprising a first high-pressure homogenization of a cream product having a fat content not greater than 40% by weight, wherein the temperature is between 60° C. and 75° C. and the pressure is between 10 and 100 bars, an ultra heat treatment, wherein the temperature is between 135° C. and 145° C., a first cooling stage, a second high-pressure homogenization, wherein the temperature is between 60° C. and 75° C. and the pressure is between 70 bar and 90 bars. It also teaches that if the milk is homogenized, the diameter of the fat globules is greatly reduced.

Accordingly, there is a general teaching in the prior art that increasing the pressure in a homogenization step decreased the diameter of the fat globules.

SUMMARY

The present invention concerns frozen dairy products, and in particular ice creams. The present invention aims at solving the technical problem of providing low overrun ice creams with reduced fat content and a method for reducing fat content in ice creams.

In particular, the present invention aims at solving the technical problem of providing low overrun ice creams with reduced fat content and a method for reducing fat content in low overrun ice creams, with little or no negative impact in organoleptic properties, in particular on creaminess and/or mouthfeel.

The present invention aims at solving the technical problem of providing low overrun ice creams with reduced fat content and a method for reducing fat content in low overrun ice creams, in particular with little or no negative impact on meltdown or even an improved meltdown resistance in order to limit melting of ice creams at room temperature.

In particular, the present invention aims at solving the above technical problems with an industrial process.

A process for preparing a homogenized and pasteurized mix for an ice cream having an overrun of less than 75% is provided herein. A process can include a homogenization step for homogenizing the ingredients of the mix and a step of pasteurization of the mix, where the mix includes at least 11% by weight of fat with respect to the total weight of the mix. In some embodiments, the homogenization step is performed at a pressure of more than 8 MPa (80 bars) if said mix comprises at least 15% by weight fat, and the homogenization step is performed at a pressure of at least 1.5 MPa (150 bars) if said mix comprises 11% to 15% by weight fat. In some embodiments, the pasteurization step is performed at a temperature in the range of 84 to 92° C.

In some embodiments of a process for preparing a homogenized and pasteurized mix for ice cream, the homogenizing step can be performed at a pressure of at least 9.5 MPa (95 bars) and less than 60 MPa (600 bars). In some embodiments, the homogenizing step can be performed at a pressure of 10 MPa (100 bars) to 30 MPa (300 bars).

In some embodiments of a process for preparing a homogenized and pasteurized mix for ice cream, the pasteurization step can be performed at a temperature in the range of 85° C. to 92° C., preferably in the range of 87° C. to 92° C., typically at about 90° C.

In some embodiments of a process for preparing a homogenized and pasteurized mix for ice cream, the mix can have a content of fat of 11% to 35% by weight relative to the total weight to the ice cream mix.

In some embodiments of a process for preparing a homogenized and pasteurized mix for ice cream, the mix can have a fat globule size distribution, where at least 50% of the globules by volume have a particle size between 1 and 10 μm, preferably between 1.5 and 10 μm.

In some embodiments of a process for preparing a homogenized and pasteurized mix for ice cream, the pasteurization of step can be performed before the homogenization step, or the homogenization step can be performed before the pasteurization step.

Also provided is a mix for an ice cream having an overrun of less than 75%. The mix can contain at least water, fat, milk protein, and one or more carbohydrates, where the mix has at least 11% by weight of fat with respect to the total weight of the mix, where the mix is obtained by a process described herein.

A process for preparing an ice cream is also provided. The process comprises providing a mix described herein, aerating the mix to an overrun of less than 75%, and bringing the aerated mix to a temperature below 0° C., preferably below –5° C., preferably between –10° C. and –25° C., thereby providing an ice cream.

An ice cream is also provided herein. An ice cream can contain at least water, fat, milk protein, and one or more carbohydrates, where the ice cream has at least 11% by weight of fat with respect to the total weight of the mix, where the ice cream has an overrun of less than 75%, and where the ice cream is prepared from a mix provided herein, or is made according to a process for preparing an ice cream provided herein.

Provided herein is a use of a process for preparing a homogenized and pasteurized mix for an ice cream having an overrun of less than 75% described herein for reducing the fat content and maintaining organoleptic properties of an ice cream comprising at least 11% by weight of fat with respect to the total weight of the ice cream and having an overrun of less than 75%. The process includes a homogenization step performed at a pressure of more than 8 MPa (80 bars), preferably of at least 95 MPa (95 bars).

Provided herein is a use of a process for preparing an ice cream having an overrun of less than 75% described herein for reducing the fat content and maintaining organoleptic properties of an ice cream comprising at least 11% by weight of fat with respect to the total weight of the ice cream and having an overrun of less than 75%. The process includes a homogenization step performed at a pressure of more than 8 MPa (80 bars), preferably of at least 95 MPa (95 bars).

Provided herein is a use of a process for preparing a homogenized and pasteurized mix for an ice cream having an overrun of less than 75% described herein for reducing the fat content and maintaining or increasing the creaminess sensation of an ice cream comprising at least 11% by weight of fat with respect to the total weight of the ice cream and having an overrun of less than 75%. The process includes a homogenization step performed at a pressure of more than 8 MPa (80 bars), preferably of at least 95 MPa (95 bars).

Provided herein is a use of a process for preparing an ice cream having an overrun of less than 75% described herein for reducing the fat content and maintaining or increasing the creaminess sensation of an ice cream comprising at least 11% by weight of fat with respect to the total weight of the ice cream and having an overrun of less than 75%. The process includes a homogenization step performed at a pressure of more than 8 MPa (80 bars), preferably of at least 95 MPa (95 bars).

Provided herein is a use of a process for preparing a homogenized and pasteurized mix for an ice cream having an overrun of less than 75% described herein for limiting meltdown of the ice cream. The process includes a homogenization step performed at a pressure of more than 8 MPa (80 bars), preferably of at least 95 MPa (95 bars).

Provided herein is a use of a process for preparing an ice cream having an overrun of less than 75% described herein for limiting meltdown of the ice cream. The process includes a homogenization step performed at a pressure of more than 8 MPa (80 bars), preferably of at least 95 MPa (95 bars).

These and various other features and advantages will be apparent from a reading of the following detailed description.

DETAILED DESCRIPTION

Consumers enjoy decadent frozen dairy products, such as ice cream. Such frozen dairy products derive their decadence at least in part through a relatively high fat content, which imparts a creamy mouthfeel and flavor to frozen dairy products. However, many consumers would prefer to reduce their fat consumption, even while consuming decadent frozen dairy products. Unfortunately, frozen dairy products, such as ice cream, tend to lose their decadent mouthfeel and flavor with reduced fat content. Reduced fat content also frequently increases susceptibility of melting of such frozen dairy products.

The present inventors have surprisingly discovered that the above-recited technical problems are overcome by the present invention. In particular, the present inventors have discovered that increasing homogenizing pressure surprisingly increases fat globule size in mixes for low overrun ice creams. This was unexpected by a skilled person who expected, on the contrary, that increasing homogenizing pressure would provide smaller fat globules.

The present inventors have also discovered that increasing homogenizing pressure increases the organoleptic properties, in particular on creaminess perception and/or mouthfeel in low overrun ice creams. It is believed that, by producing bigger fat globules, increasing homogenizing pressure results in higher creaminess perception. Thus, the present invention provides a way to increase creaminess perception and a desirable mouthfeel in low overrun ice creams.

Further, the present invention provides a way to reduce fat content in high fat and low overrun ice creams while maintaining the organoleptic properties, particularly on creaminess perception and/or mouthfeel.

In addition, the present inventors have discovered that increasing the temperature in a pasteurization step of mixes for high fat and low overrun ice creams positively impacts the meltdown resistance of ice creams. Accordingly, low overrun ice creams provided herein can exhibit limited melting at room temperature, even with a reduced fat content.

Provided herein is a process for preparing a homogenized and pasteurized mix for a low overrun ice cream. As used herein, low overrun ice creams have an overrun of less than 75%.

Processes

A mix suitable for using in a process provided herein can be in dry form or liquid form. A dry mix is hydrated to form a liquid mix prior to use in a process herein.

It was surprisingly discovered that a homogenization step that includes at least one stage performed at a pressure at least 1.5 times (e.g., 1.5 times to 2.5 times) higher than typically used to homogenize ice cream mixes results in an increase in fat globule size. Previous approaches would typically homogenize ice cream mixes at a pressure in the range of up to about 10 MPa (100 bars), with mixes at a lower fat content (e.g., less than 18% fat by weight) being homogenized at the higher end of that range and mixes with higher fat content (e.g., greater than 18% fat by weight) being homogenized at the lower end of that range (e.g., up to about 75 bars). In contrast, the present invention employs a homogenization step that includes at least one stage at least 1.5 times higher than previously employed to achieve larger fat globules. Advantageously, a high-pressure homogenization step described herein can increase fat perception, allowing for reduced fat content while maintaining fat perception or maintaining fat content while increasing fat perception.

For example, if a homogenization step for an ice cream mix would typically be done at a pressure of 5 MPa, the present invention provides a benefit at a pressure of about 7.5 MPa to about 12.5 MPa. For example, if a homogenization step for an ice cream mix containing about 18% fat by weight would typically be done at a pressure of 5 MPa, a homogenization step at a pressure of about 10 MPa could be performed to achieve a mix with reduced fat (e.g., about 14-16% fat) with maintained fat perception, or a mix the same fat content (18% fat) with an increased fat perception.

In another example, if a homogenization step for an ice cream mix would typically be done at a pressure of 8 MPa, the present invention provides a benefit at a pressure of about 12 MPa to about 20 MPa. In yet another example, if a homogenization step for an ice cream mix would typically be done at a pressure of 10 MPa, the present invention provides a benefit at a pressure of about 15 MPa to about 25 MPa. For example, if a homogenization step for an ice cream mix containing about 15% fat by weight would typically be done at a pressure of 10 MPa, a homogenization step at a pressure of about 20 MPa could be performed to achieve a mix with reduced fat (e.g., about 12-14% fat) with maintained fat perception, or a mix the same fat content (15% fat) with an increased fat perception.

It is preferred that pressure in a homogenization step is less than 10 times higher than typically used to homogenize ice cream mixes to reduce the risk of phase separation of the mix.

A process provided herein includes a step of homogenizing ingredients of an ice cream mix described herein. A homogenization step suitable for a process provided herein is higher than typically performed for an ice cream mix. A homogenization step provided herein is performed at a pressure of more than 8 MPa (80 bars) (e.g., at least 9.5 MPa (95 bars)). Preferably, a homogenization step is performed at a pressure of less than 60 MPa (600 bars). In some embodiments, a homogenization step is performed at a pressure of at least 9 MPa (90 bars), or from about 10 MPa (100 bars) to about 30 MPa (300 bars), or from about 10 MPa (100 bars) to about 20 MPa (200 bars).

In some embodiments, an ice cream mix having a fat content of 11% to 15% can be homogenized using a homogenization step that includes at least one stage at a pressure of at least 15 MPa (e.g., at least 18 MPa, or at least 20 MPa). In some embodiments, an ice cream mix having a fat content of 15% to 25% can be homogenized using a homogenization step that includes at least one stage at a pressure of at least 8 MPa (e.g., between 9 MPa and 20 MPa).

In some embodiments, homogenization can be performed at a temperature of from 70° C. to 150° C. Preferably, homogenization is performed at a temperature of about 70° C. to about 90° C.

In some embodiments, homogenization can be performed in two stages (e.g., in a two-stage homogenizer). When performed in two stages, at least one stage (e.g., the first stage) can be performed using a micro-gap valve, a nano-gap valve, a ball valve, or a mushroom valve. In some embodiments, a two-stage homogenization step can have one stage performed at a lower pressure than the other stage. In some embodiments, one stage (e.g., the second stage) of a two-stage homogenization can be at a pressure that is less than 8 MPa (80 bars).

Homogenization can be performed using any appropriate equipment. For example, a high-pressure homogenizer can be used. Typically, a high-pressure homogenizer can be operated at a pressure ranging from 5 MPa to 60 MPa (50 to 600 bars). For example, a high-pressure homogenizer can be used at a pressure of from 20 MPa to 50 MPa (200 to 500 bars), or from 20 MPa to 30 MPa (200 to 300 bars).

A homogenization step described herein can result in a mix that comprises a fat globule size distribution (granulometry) that has two peaks (i.e., is bimodal). The second peak of the bimodal distribution can have a mode of at least 1 μm (e.g., at least 1.5 μm, at least 2 μm, or about 3 μm). In some embodiments, the D90 of the fat globule population in a mix can be at least 5 μm (e.g., at least 6 μm, at least 7 μm, or about 8 μm). As used herein, the term "mode" used in reference to a particle size distribution peak refers to the particle size at the maximum volume of the peak, where particle size is measured in μm on the x-axis and volume is measured as % of the particle population on the y-axis. As used herein, the value of a D90 is the diameter below which 90% of the particles in a distribution fall within the distribution. That is, a D90 of 5 μm means that 90% of the population of particles within a distribution have a diameter below 5 μm. In some embodiments, at least 50% of the globules by volume have a particle size between 1 and 10 μm, preferably between 1.5 and 10 μm.

The measurement of the size of fat globules may be determined according to the method described in the examples.

Because a high-pressure homogenization step described herein can increase fat perception, in some embodiments, a process described herein including a homogenization step including a stage performed at a pressure of more than 8 MPa (80 bars) can be used for increasing the creaminess sensation of a low overrun ice cream having a fat content of at least 11% by weight. In some embodiments, an ice cream made from a mix homogenized at high pressure can be perceived to be denser, smoother, creamier, and/or less cold to eat.

In some embodiments, increasing fat perception using high-pressure homogenization can allow a reduction in fat content while maintaining a high quality ice cream, particularly in terms of organoleptic properties (see notably D. M. Dresselhuis et al.; The occurrence of in-mouth coalescence of emulsion droplets in relation to perception of fat; Food Hydrocolloids 22 (2008) 1170-1183; doi:10.1016/j.foodhyd.2007.06.013). Thus, in some embodiments, a process described herein including a homogenization step including a stage performed at a pressure of more than 8 MPa (80 bars) can be used for reducing the fat content and maintaining organoleptic properties of a low overrun ice cream having a fat content of at least 11% by weight. In some embodiments, a process described herein including a homogenization step including a stage performed at a pressure of more than 8 MPa (80 bars) can be used for reducing the fat content and maintaining or increasing the creaminess sensation of a low overrun ice cream having a fat content of at least 11% by weight.

In some embodiments, a homogenized ice cream mix is cooled to a temperature below the temperature during homogenization. For example, a homogenized ice cream mix can be chilled to room temperature (about 20° C.) or less. Typically, a homogenized ice cream mix is not chilled to a temperature below 0° C. until ready to be used to produce an ice cream.

In a preferred embodiment of the present invention, no emulsifier is added to the mix, except naturally occurring endogenous emulsifiers present in the raw materials, such as egg yolk and milk.

A mix can be homogenized before or following pasteurization. In some embodiments, if a two-stage homogenization step is used, one or both stages can be performed before or after pasteurization. For example, in some embodiments, one stage of a homogenization step can be performed before pasteurization and one stage of a homogenization step can be performed after pasteurization.

In some embodiments, if present, flavorants can be added after the homogenization step.

A process provided herein includes a step of pasteurizing an ice cream mix. Any pasteurization process sufficient to result in pasteurization of an ice cream mix can be used. For example, pasteurization can be at a temperature of 70° C. to 155° C. for 3 seconds to 10 minutes. Pasteurization conditions typical for treating ice cream mixes range from about 80° C. to about 85° C. for less than 2 minutes.

However, in some embodiments, a pasteurization step suitable for a process provided herein can be at a temperature higher than typically performed for an ice cream mix to provide a benefit of increasing melt resistance. For example, a pasteurization step provided herein can be performed at a temperature in the range of 84° C. to 92° C. (e.g., about 85° C. to about 92° C., about 87° C. to about 92° C., or about 90° C.) for a time of 30 seconds to 3 minutes. It is preferred that the pasteurization step is performed for a time of at least 60 seconds to prevent undesired bacterial contamination, but less than 8 minutes (e.g., less than 6 minutes) to prevent degradation of organoleptic properties or development of cooked flavors. In some embodiments, a pasteurization step can be at a temperature of from 88° C. to 90° C. for about 90 seconds.

In some embodiments, a pasteurization step is sufficient to denature protein in an ice cream mix at least in part, resulting in an ice cream mix containing at least some denatured protein.

In some embodiments, an ice cream made according to a process that includes a high temperature pasteurization step provided herein can have a melt time of at least 60 minutes (e.g., at least 70 minutes, or at least 80 minutes), as determined according to the method described in the Examples herein.

A mix can be pasteurized using a batch process or a continuous process using any appropriate equipment and method, such as direct steam injection or plate heat exchange.

If present, flavorants are preferably added following pasteurization to reduce the impact of heat and/or homogenization on flavor and/or integrity of solid inclusions.

A mix prior to pasteurization is sometimes referred to as a premix.

A high-temperature pasteurization step used on a mix can improve meltdown resistance in an ice cream made with the mix. Thus, a process described herein including a pasteurization step at a temperature of 84° C. to 92° C. (e.g., 85° C. to 92° C., 87° C. to 92° C., or about 90° C.) can be used for limiting meltdown of a low overrun ice cream having a fat content of at least 11% by weight.

In some embodiments, a homogenized and pasteurized mix can be stored prior to being used to make an ice cream. A homogenized and pasteurized mix can be stored at any appropriate temperature, typically above freezing. For example, a mix can be held at room temperature (e.g., about 20° C.) or chilled (e.g., below 20° C., or at about 4° C.).

A homogenized and pasteurized mix can be used to make an ice cream using any known method. Typically, a mix is chilled to a temperature below 0° C. (e.g., below −5° C., or from about −10° C. to about −25° C.) to produce an ice cream. A mix can be optionally aerated before or during the chilling process to produce an ice cream.

In some embodiments, a process for preparing an ice cream includes a step of preparing a mix, pasteurizing and homogenizing the mix, freezing and aerating the pasteurized and homogenized mix to form a soft ice, and hardening the soft ice to produce the ice cream. In some embodiments, a soft ice is extruded into a package and then hardened in the package. If a soft ice is extruded, the extrusion temperature is typically in the range of about −3° C. to about −10° C. (e.g., about −5° C. to about −9° C.).

Aeration increases the volume of an ice cream. The volume increase is known as overrun. Overrun (%) is classically defined as the percent increase in the volume of a frozen dairy product relative to a mix as the result of the air that is incorporated during the freezing and whipping process. For example, if 1 L of mix produces 2 L of frozen dairy product (i.e., 1 L of air whipped into a 1 L mix), the overrun is said to be 100%. In some embodiments, a mix provided herein can be aerated to result in a low overrun, or an overrun of less than 75%. In some embodiments, a frozen dairy product provided herein can have an overrun from about 15% to 75%. In some embodiments, a frozen dairy product provided herein can have an overrun from about 22% to about 55%. In some embodiments, a frozen dairy product provided herein can have an overrun from about 20% to about 50%.

In some embodiments, a process for preparing an ice cream can be a continuous process including homogenizing the ingredients, pasteurization, cooling, freezing and aerating, extrusion of a soft ice, and hardening the soft ice.

In some embodiments, a process for preparing a mix for ice cream can include a) mixing water, one or more fats, one or more milk proteins, one or more carbohydrates, one or more emulsifiers (e.g., egg yolk), and optionally one or more flavorants to form a composition; b) optionally homogenizing the composition of step a; c) pasteurizing the composition of step a or b; d) homogenizing the composition of step c at high pressure; and optionally aerating the composition of step d.

In some embodiments, a process for preparing a mix for ice cream can include a) mixing water, one or more fats, one or more milk proteins, one or more carbohydrates, one or more emulsifiers (e.g., egg yolk), and optionally one or more flavorants to form a composition; b) homogenizing the composition of step a at high pressure; c) pasteurizing the composition of step b; d) optionally homogenizing the composition of step c; and optionally aerating the composition of step d.

Ice Cream and Ice Cream Mix

A mix for preparing a frozen dairy product is provided herein that takes advantage of the discoveries described above. The present invention is particularly advantageous to high fat ice creams with a low overrun. Such ice creams are typically premium quality such as those marketed by Häagen-Dazs®.

In the present application, "mix" designates a mix for preparing ice cream unless stated otherwise. As used herein, unless specified otherwise, the content or concentration of mix components is expressed in percent (%) by weight relative to the total weight of the mix, excluding the weight of solid inclusions if any.

An ice cream or mix for preparing ice cream contains one or more dairy ingredients. Appropriate dairy ingredients for use in a mix or ice cream provided herein include, without limitation, cream, dried cream, plastic cream (also known as concentrated milk fat), butter, butter oil, milk, concentrated milk, evaporated milk, sweetened condensed milk, super-heated condensed milk, dried milk, skim milk, concentrated skim milk, evaporated skim milk, condensed skim milk, superheated condensed skim milk, sweetened condensed skim milk, sweetened condensed part skim milk, powder skim milk, nonfat dry milk, sweet cream buttermilk, con-densed sweet cream buttermilk, dried sweet cream butter-milk, skim milk that has been concentrated and from which part of the lactose has been removed by crystallization, skim milk in concentrated or dried form which has been modified by treating the concentrated skim milk with calcium hydrox-ide and disodium phosphate, and whey and those modified whey products—such as reduced lactose whey, reduced minerals whey, and whey protein concentrate for example that have been determined by the Food and Drug Adminis-tration to be generally recognized as safe (GRAS) for use in this type of food. In some embodiments, water may be added, or water may be evaporated from a dairy ingredient. For example, sweet cream buttermilk and concentrated sweet cream buttermilk or dried sweet cream buttermilk, when adjusted with water to a total solids content of 8.5%, has a titratable acidity of not more than 0.17%, calculated as lactic acid. Preferably, the term "milk" means cow's milk, but can include a milk from any suitable mammal (e.g., goat, sheep, buffalo, camel, or llama).

Fat content in a mix provided herein can be from about 11% to about 35% by weight relative to the total weight to the mix. In some embodiments, a mix can have a fat content of about 11% to about 25% (e.g., about 11.5% to about 19%, about 11.5% to about 16%, about 13% to about 19%, about 12% to about 14%, or about 14% to about 25%) by weight relative to the total weight to the mix. In some embodiments, such as in a mix suitable for making a frozen yogurt, the mix can have a fat content of about 8% to about 13% (e.g., about 9% to 12%) by weight relative to the total weight to the mix. In some embodiments, a mix provided herein can contain a fat amount less than typically included in a low overrun ice cream. In some embodiments, a mix or ice cream according to the invention can have a fat content reduced by 10% to 20% (e.g., about 15%) relative to the fat content of classical mix or ice cream composition. For example, a mix provided herein can be formulated to make an ice cream with a fat content less than 15%, yet retain a creamy mouthfeel.

In some embodiments, a mix can include a vegetable butter such as, for example, cocoa butter, peanut butter, almond fat, hazelnut fat, or coconut fat.

As used herein, "vegetable butter" (also "botanical but-ter") is a triglyceride comprising saturated and unsaturated fatty acids from a plant. Generally, a vegetable butter includes a fat and/or oil extract of a plant fruit and/or seed having a melting point above 20° C. and usually above 25° C. and usually near 30-40° C.

In some embodiments, a vegetable butter can also serve as a flavorant in a mix. For example, such flavorants can include for example cocoa butter, peanut butter, almond fat, hazelnut fat, or coconut fat.

In some embodiments, heavy cream and/or egg yolks can contribute a fat to a mix. Heavy cream usually contains about 40% fat and about 45% solids. Fat in cream, milk, or egg yolk is considered to be endogenous fat in a mix or frozen dairy product provided herein. In some embodiments, a mix or frozen dairy product provided herein can contain fat naturally occurring in flavorants, such as cocoa powder.

In some preferred embodiments, no exogenous liquid oil is added to a mix provided herein, other than those naturally present in an included flavorant (e.g., cacao butter). As used herein "liquid oil" refers to a fat that is liquid at 20° C.

A mix provided herein can contain egg yolk solids. In some embodiments, a mix can have an egg yolk solids content of about 1% to about 8% (e.g., about 2% to 6%) by weight relative to the total weight of the mix. Suitable sources of egg yolk solids include liquid egg yolks, frozen egg yolks, dried egg yolks, liquid whole eggs, frozen whole eggs, dried whole eggs, or a combination thereof. Pasteur-ized liquid frozen egg yolk is often sold for commercial purposes with about 10% sucrose added. Egg yolks can help emulsify the other ingredients and include about 20% to about 24% by weight of fat, typically about 22% by weight of fat with respect to the weight of egg yolk. In some embodiments, a mix or ice cream can also contain other suitable emulsifiers other than egg yolk.

A mix or ice cream provided herein typically contains sugar. A sugar may be selected from monosaccharides, disaccharides, oligosaccharides, and mixtures thereof. Suit-able examples include sucrose, fructose, lactose, glucose and corn syrups.

In some embodiments, a mix contains added sugar. As used herein, the term "added sugar" means sugar added in addition to the sugar endogenous to other ingredients. Other ingredients, such as dairy ingredients or flavorants, may contain naturally occurring sugar, which is not considered "added sugar". In some embodiments, a mix comprises added sugar in an amount of about 8% to about 25% (e.g., about 9% to 25%, or about 10% to about 20%) by weight relative to the total weight of the mix.

A mix can include milk solid non-fat (MSNF) content of about 6% to about 13% (e.g., about 7% to about 12%) by weight relative to the total weight of the mix. A mix provided herein can have a total solids content of about 35% to about 55% (e.g., about 40% to about 51%) by weight relative to the total weight of the mix. As used herein, the terms "milk solids non-fat content" and "total solids content" do not refer to solid inclusions. Measurement of total solid content and fat content after homogenization may be determined accord-ing to the present invention as described in the examples.

A mix can have a protein content from about 3.5% to about 6% by weight of the mix, not including solid inclu-sions. Proteins in a mix can include endogenous milk proteins, typically from concentrated milk, cream, and/or egg yolk proteins.

A mix or ice cream provided herein can also include flavorants such as, for example, vanilla, chocolate, coffee, fruit, nuts, liqueur, vegetable, tea, and candy. These fla-vorants can be provided in the form of a powder, puree, paste, syrup, concentrate, extract, alcohol, liquid, solid inclusions, or a combination thereof. Flavorants can, in some embodiments, affect the amount of other ingredients added to a mix or ice cream.

In many embodiments, an ice cream or mix provided herein generally comprises at least water, fat, milk protein, and one or more carbohydrates. Some embodiments of an ice cream or mix generally comprise butterfat, milk solids non-fat ("MSNF"), sweeteners, water and optional other ingredients, e.g., flavors, salt, stabilizers, emulsifiers, and the like. In some embodiments, only dairy products are used as fatty ingredients in the mix. Some embodiments of an ice cream or mix comprise edible inclusions (solid), such as nuts, solid fruit pieces, cookie chips, and the like, which are typically distributed within the mix or frozen dairy product.

Some embodiments of an ice cream mix contain or consist of sugar, condensed skim milk, cream, egg yolk, water, and optionally flavorants. In some embodiments, an ice cream mix contains or consists of sugar in an amount of about 2% to about 15%, condensed skim milk in an amount of 16% to about 30%, cream in an amount of about 30% to about 45%, egg yolk in an amount of about 3% to about 7%, water and optionally flavorants. In some embodiments, an ice cream mix consists of condensed skim milk, cream, egg yolk, sugar and optionally one or more flavorants and/or cacao butter.

An ice cream is a frozen food made by freezing a pasteurized mix with agitation to incorporate air. An ice cream typically contains ice, air, fat, and a matrix phase.

The skilled artisan will appreciate that the above described preferred product embodiments contain only milk based ingredients, sweeteners, flavors, and other ingredients (e.g., egg yolk) perceived as natural, and do not contain any emulsifiers, stabilizers or other ingredients perceived by consumers as being artificial. Accordingly, it is an advantage that the present invention can be used to prepare milk based frozen desserts, aerated or non-aerated, which are "all natural," which for purposes of this invention is used to describe products hereof which are free of added emulsifiers and stabilizers. Advantageously, such "all natural" product can also successfully be made as low fat.

The present dessert compositions can optionally contain a variety of additional ingredients suitable for rendering such compositions even more organoleptically or aesthetically desirable or nutritious. Such optional ingredients include, for example, flavors, coloring agents, nuts, cookie bits, vitamins, preservatives and the like. If present, such minor optional components should each comprise about 0.1% to 5% by weight of the frozen dairy product.

One preferred optional ingredient is conventional stabilized fruit for frozen dairy product. Stabilized fruit for frozen dairy product is commonly used in the frozen dairy product industry. Such material comprises fruit pieces which have been sugar or gum treated to remain soft at the typical freezer temperatures at which a frozen dairy product is typically stored. Stabilized fruit can be desirably added to the present composition just prior to optional aeration and freezing.

As used herein, the term "a" means "one or more" unless stated otherwise. As used herein, the term "comprising" means that the mix or ice cream, process or method, can comprise other ingredients or steps, unless stated otherwise. Accordingly, the term "comprising" encompasses the more restrictive terms "consisting essentially of" and "consisting of".

As used herein, the term 'the present invention" means any embodiment, preferred and/or optional features of the invention, including any of their combinations.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of those in the food art, can be undertaken without departing from the scope of the invention.

Throughout the specification and claims, percentages and ratios are by weight and temperatures in degrees Celsius unless otherwise indicated.

EXAMPLES

Testing and Measurement Methods

Measurement of Total Solid and Fat Content after Homogenization Step

Fat and total solid content of ice cream mix were measured by DS2500 device. The DS2500 (Foss Analytics, Foss France 35 rue des peupliers, 92752 Nanterre Cedex) is a quick, near-infrared analyzer that measures fat and total solid from ice cream mixes. It uses the principle of reflectance. The device was calibrated with the ANN Calibration to be qualified on the scope of fat and total solid content of the products of the examples.

Measurement of Fat Globule Size

Particle size distributions (granulometry) were measured by static light scattering (SLS) using a Malvern Mastersizer 3000 apparatus (Malvern Instruments Ltd., Malvern, UK) operating with two laser sources (466 and 633 nm). One drop of ice cream mix after pasteurization was introduced into 120 ml water re-circulating at 20° C. in the dispersion unit (Hydro SM) at 1800 rpm.

The size distribution of particle volume frequency (i.e. the cumulative volume fractions of the different size classes of particles were equal to 1) or volume-based PSD was then calculated. The calculation was performed using software provided with the Malvern Mastersizer using the general polydisperse model, spherical shape code and values of 0.001 for the adsorption index and 1.492 for the real part of the particle RI (Refractive Index).

Homogenizers Used

The trials in examples were performed with a homogenizer Gaulin Type G5T-5.8B with ball valve.

% Overrun

Overrun is set as follows:

$$\% \text{ Overrun} = (\text{Volume of ice cream} - \text{Volume of mix used})/\text{Volume of mix used} \times 100\%$$

Measurement of Ice Crystals Stability: Accelerated Shelf Life Testing (ASLT)/Ice Crystals Experiments with frozen dairy products have been performed to show the effect of the denaturized exogenous whey proteins on crystal size after ASLT. For a same formulation but with denaturized exogenous whey proteins, the evolution of the average size of the crystals during the shelf life of the product is less apparent with denaturized exogenous whey proteins.

The samples are stored for an accelerated shelf life test (ASLT) at −12.2° C. instead of −26° C. at selected intervals as follows:

a. Week 0: the sample is stored in control freezer (−26° C.)

b. Week 1: the sample is stored at −12.2° C. during one week then hold in the control freezer c. Week 3: the sample is stored at −12.2° C. during three weeks and hold in the control freezer. 3 weeks are representative of a product in a middle of life (6 months when the sample is stored in classical conditions)

Week 5: the sample is stored at −12.2° C. during five weeks and hold in the control freezer. 5 weeks are representative of a product at the end of this life (1 year when the sample is stored in classical conditions)

Measurement of Melting Time

Frozen dairy products have undergone a meltdown test to show the effect of the invention on the meltdown resistance. Briefly, samples are stored at −25° C. prior to testing. The meltdown test is performed in a meltdown analyzer, under controlled and constant conditions of temperature (20° C.) and humidity (80%). Each standardized frozen dairy product sample (samples all have the same volume and shape; each sample is 1 pint and in the shape of a pint container) is placed on a perforated tray positioned above a recovery plate in the meltdown analyzer. Every 5 seconds, weight loss of sample on the perforated tray is recorded and weight of

| sample collected on the recovery plate is recorded. Melting time is recorded as the time at which weight loss of a sample is at 0.5% of the initial sample weight. Tests are performed in 2 repetitions.

Example 1—Process for Preparing a Mix for Ice Cream According to the Invention with High Pressure Homogenization and High Pasteurization Temperature Mixes for vanilla ice cream were made and treated according to Table 1. The control was a mix typical of those used in ice creams found on the market with a fat content less than 18%, which was homogenized and pasteurized using conditions typical of such ice cream mixes. Two test mixes were made using either a high temperature pasteurization only (TPasto) or using both a high temperature pasteurization and a high-pressure homogenization (PHomo & TPasto). The PHomo & TPasto mix included less cream (fat content of −15% by weight), more water, higher pressure homogenization (approximately 2× of control, here 18-20.5 MPa, or 180-205 bars, for the first stage), higher temperature pasteurization (88° C.). The TPasto mix was identical to the control formula and was treated with classical homogenization but a higher pasteurization temperature (88° C.).

TABLE 1

| | | | Invention (PHomo & TPasto) | Invention |
| | Unit | Control | (−15% fat) | (TPasto) |
|---|---|---|---|---|
| Homogenization (first stage) | Bars | 80-105 | 180-205 | 80-105 |
| Pasteurization | ° C./ sec | 81-83° C./ 85-100 sec | 87-89° C./ 85-100 sec | 87-89° C./ 85-100 sec |
| CREAM | % | 39-40 | 33-34 | 39-40 |
| CONDENSED SKIM MILK | % | 25-26 | 25-26 | 25-26 |
| EGG YOLK | % | 4.5-5 | 4.5-5 | 4.5-5 |
| SUGAR | % | 13-14 | 13-14 | 13-14 |
| WATER | % | 16-17 | 22-23 | 16-17 |
| OVERRUN | % | 20-30 | 20-30 | 20-30 |
| Total Solids | % | 41-42 | 39-40 | 41-42 |
| Total Fat | % | 16-17 | 14-14.5 | 16-17 |

Formulation of the mixes

Table 2 represents the granulometry on each mix after homogenization control (16-17% fat, 100 bars) versus high pressure (14-14.5% fat, 200 bars). A bimodal distribution was apparent, with the first peak for both samples being very similar, but the second peak shifting to the right in the high pressure sample. According to Table 2, the diameter of the fat globules of the second peak is shifts following high pressure homogenization. In addition, 90% of all the fat globules in the control sample are of a diameter of 4.5 μm or less (D90), while the D90 of the high pressure sample is about 9 μm.

TABLE 2

| | | | Invention (PHomo & TPasto) |
| | Unit | Control | (−15% fat) |
|---|---|---|---|
| Homogenization pressure | Bars | 100 | 200 |
| Mode of first peak | μm | 0.05 | 0.05 |

TABLE 2-continued

| | | | Invention (PHomo & TPasto) |
| | Unit | Control | (−15% fat) |
|---|---|---|---|
| Mode of second peak | μm | 0.8 | 4.58 |
| D90 of the all globules | μm | 4.5 | 9 |

Similar results were obtained on salted caramel ice cream, Belgian chocolate ice cream, and mango ice cream.

Increasing the homogenization pressure on high fat and low overrun mix for ice creams increased the size of fat globules and thereby provides a better taste, in particular, a better mouthfeel and creaminess perception.

Example 2—Freezing of Ice Creams

Each of the ice cream mixes from Example 1 were used to produce ice cream under the same conditions (ice cream flow rate, overrun, viscosity, cylinder pressure, dasher speed, and drawing temperature at freezer outlet).

Each of the resulting ice creams were evaluated as satisfactory for consumers. In particular, the mouthfeel and creaminess of the PHomo & TPasto sample was found to be satisfactory according to a taste test, while having a reduced fat content.

Example 3—Impact of Pasteurization Temperature on Meltdown Resistance of Ice Creams The ice creams of example 1 were subjected to a melt test to show the effect of the preparation process on the meltdown resistance. The melting time was increased when a higher pasteurization temperature is applied with the same formula (compare TPasto with control in Table 3). This supports the effect on meltdown resistance of pasteurizing such high fat and low overrun ice creams at a higher temperature than the control. In addition, the melting time was improved relative to the control ice cream if the temperature is increased, even if fat content is reduced (PHomo & TPasto ice cream as compared control in Table 3).

TABLE 3

| | | | Invention (PHomo & TPasto) | Invention |
| | Unit | Control | (−15% fat) | (TPasto) |
|---|---|---|---|---|
| Homogenization pressure | Bars | 100 | 200 | 100 |
| Pasteurization temperature | ° C. | 82.5 | 88 | 88 |
| Format | | Pint | Pint | pint |
| Melting Time | Minutes | 65 | 72 | 90 |

Example 4—Accelerated Shelf Life Testing (ASLT)/Ice Crystals

The ice creams of example 1 were tested to determine the effect of pasteurizing temperature on crystal size after ASLT.

It has been shown that for a same formulation but with a different temperature of pasteurization (compare control and TPasto ice cream), the evolution of the average size of the crystals during the shelf life of the product is less apparent when the pasteurization temperature is increased. See, Table 4.

TABLE 4

| | Unit | Control | Invention PHomo & TPasto) (−15% fat) | Invention (TPasto) |
|---|---|---|---|---|
| Homogenization pressure | Bars | 100 | 200 | 100 |
| Pasteurization temperature | ° C. | 82.5 | 88 | 88 |
| Average crystal size W0 | µm | 63 | 59 | 50 |
| Average crystal size W3 | µm | 71 | 61 | 55 |

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A process for preparing a homogenized and pasteurized mix for an ice cream that has an overrun of less than 75%, wherein said process comprises a homogenization step for homogenizing the ingredients of said mix and a step of pasteurization of the mix, wherein said mix comprises at least 11% by weight of fat with respect to the total weight of the mix, wherein the mix comprises a fat globule size distribution, wherein at least 50% of the globules by volume have a particle size between 1 and 10 µm and the D90 of the globules is at least 5 µm.

2. The process according to claim 1, wherein said homogenization step is performed at a pressure of more than 8 MPa (80 bars) when said mix comprises at least 15% by weight fat, and wherein said homogenization step is performed at a pressure of at least 15 MPa (150 bars) when said mix comprises 11% to 15% by weight fat.

3. The process according to claim 2, wherein the homogenizing step is performed at a pressure of at least 9.5 MPa (95 bars) and less than 60 MPa (600 bars).

4. The process according to claim 3, wherein the homogenizing step is performed at a pressure of 10 MPa (100 bars) to 30 MPa (300 bars).

5. The process according to claim 1, wherein the mix comprises a content of fat of 11% to 35% by weight relative to the total weight to the ice cream mix.

6. The process according to claim 2, wherein said pasteurization step is performed at a temperature in the range of 84° C. to 92° C. for a time of 30 seconds to 3 minutes.

7. The process according to claim 1, wherein at least 50% of the globules by volume have a particle size between 1.5 and 10 µm.

8. The process according to claim 1, wherein said pasteurization step is performed before said homogenization step.

9. The process according to claim 1, wherein said homogenization step is performed before said pasteurization step.

10. A mix for an ice cream that has an overrun of less than 75%, the mix comprising at least water, fat, milk protein, and one or more carbohydrates, wherein said mix comprises at least 11% by weight of fat with respect to the total weight of the mix, and wherein said mix is obtained by a process according to claim 1, and wherein the mix comprises a fat globule size distribution and the D90 of the globules is at least 5 µm.

11. A process for preparing an ice cream, wherein said process comprises providing a mix as defined in claim 10, aerating the mix to an overrun of less than 75%, and bringing the aerated mix to a temperature between −10° C. and −25° C., thereby providing an ice cream, and wherein the mix comprises a fat globule size distribution and the D90 of the globules is at least 5 µm.

12. An ice cream comprising at least water, fat, milk protein, and one or more carbohydrates, wherein said ice cream comprises at least 11% by weight of fat with respect to the total weight of the mix, wherein said ice cream has an overrun of less than 75%, and wherein said ice cream is prepared from a mix obtained by a process according to claim 1, and wherein the mix comprises a fat globule size distribution and the D90 of the globules is at least 5 µm.

13. The process according to claim 6 wherein said process comprises the pasteurization step being performed at a temperature in the range of 87° C. to 92° C.

14. The process according to claim 1, wherein the D90 of the globules is at least 6 µm.

15. The process according to claim 14, wherein the D90 of the globules is at least 7 µm.

16. A homogenized and pasteurized mix for an ice cream that has an overrun of less than 75%, wherein said mix comprises at least 11% by weight of fat with respect to the total weight of the mix, wherein the mix comprises a bimodal fat globule size distribution having a first peak and a second peak, wherein the second peak of the bimodal distribution has a mode of at least 1 µm, and wherein the D90 of the globules is at least 5 µm.

17. The homogenized and pasteurized mix of claim 16, wherein the second peak of the bimodal distribution has a mode of at least 2 µm.

* * * * *